Figure 1:
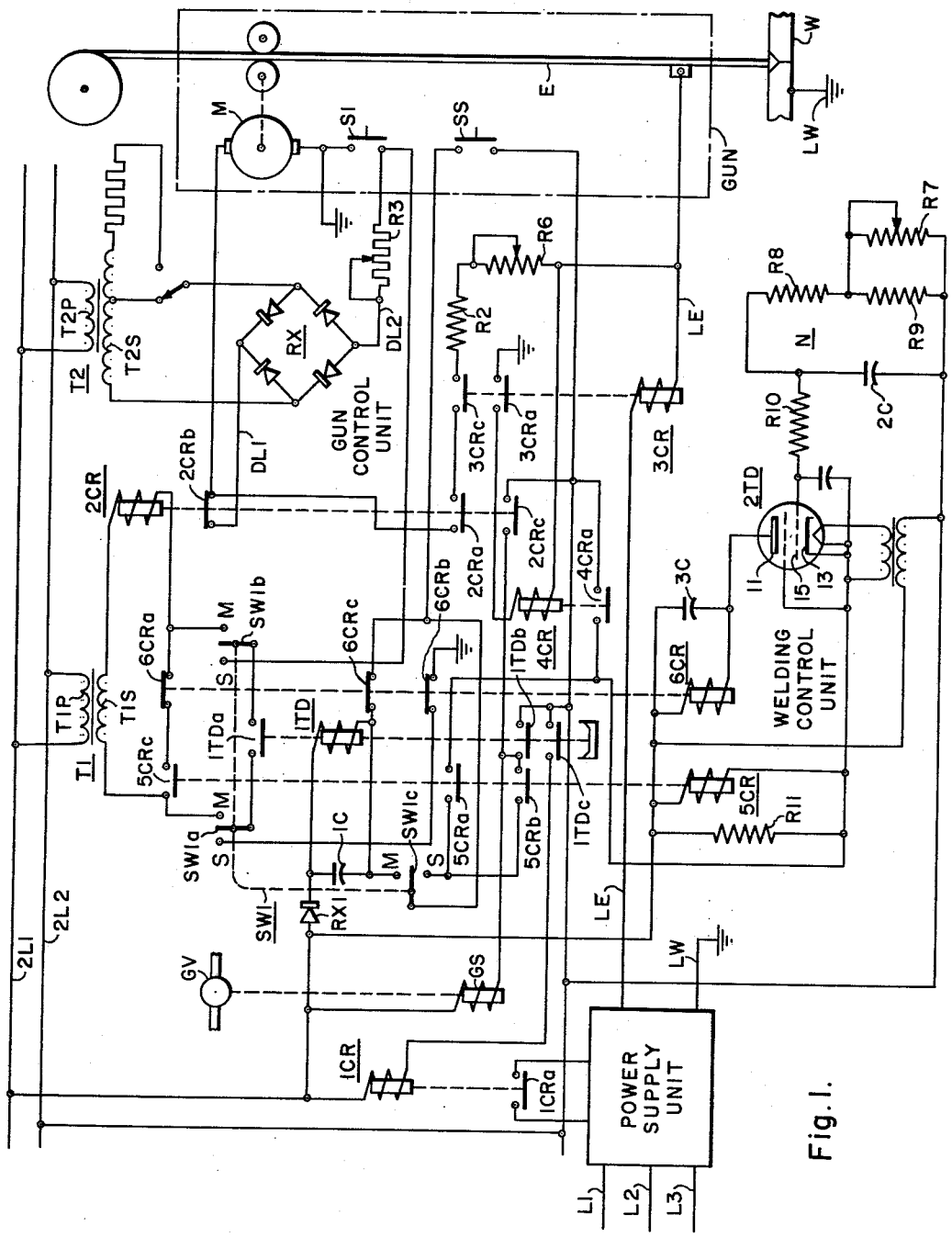

Aug. 7, 1962   H. J. BICHSEL ETAL   3,048,692
WELDING APPARATUS
Filed Sept. 4, 1959   2 Sheets-Sheet 1

Fig. I.

WITNESSES
Edwin E. Bassler
Leon M. Garman

INVENTORS
Harry J. Bichsel &
Floyd E. Adamson
BY
Wymer Diamond
ATTORNEY

United States Patent Office 3,048,692
Patented Aug. 7, 1962

3,048,692
WELDING APPARATUS
Harry J. Bichsel, East Aurora, and Floyd E. Adamson, Kenmore, N.Y., assignors to Westinghouse Electric Corporation, East Pittsburgh, Pa., a corporation of Pennsylvania
Filed Sept. 4, 1959, Ser. No. 838,256
13 Claims. (Cl. 219—131)

This invention relates to the arc-welding art and has particular relationship to arc-spot welding such as is used in producing joints that need not be gas-tight and in tacking.

An arc-spot welder is disclosed in Cameron et al. Patent 2,845,526. In the use of the apparatus disclosed in this patent, a spot weld is produced by bringing the welding electrode into engagement with the work to fire an arc, maintaining the arc between a consumable electrode and the work for a predetermined time interval and then extinguishing the arc. The duration of the arc interval is timed by a timer (2TD) the timing out of which is initiated by current-relay (R1) responsive to the current which flows between the electrode and the work when the electrode and work are first energized.

Many units of the apparatus disclosed in the Cameron patent have been sold and have given excellent performance in spot-welding. But it has been found that in situations in which the metal deposited must be precisely measured out, the Cameron apparatus does not perform satisfactorily. The lack of precision has been encountered principally in welding with a constant-current (high-impedance) power supply. To a limited extent, this lack has also been encountered in welding with a constant potential (low impedance or compounded) supply; specifically with supplies of the dynamic-reactor type such as is disclosed in application Serial No. 751,513, filed August 27, 1958, to Floyd E. Adamson and Martin Rebuffoni, and also in welding certain materials.

It is, then, an object of this invention to provide arc-spot welding apparatus and a method of arc-spot welding in the use and practice of which a precise quantity of melted metal shall be deposited in making each spot.

Another object of this invention is to provide arc-spot welding apparatus and a method of arc-spot welding in the use and practice of which the duration of the interval during which the arc burns in the forming of each spot shall be precisely measured out.

This invention arises from the discovery that in using arc-spot welding apparatus as disclosed in the Cameron patent, the precision is affected by the uncertainty of the instant when the arc is fired after the electrode is contacted with the work. It has been found in welding with a constant-current supply, with a dynamic reactor constant-potential supply and in the welding of certain materials that an appreciable interval of variable duration depending on the circumstances at hand may elapse between the contact of the electrode and the work and the firing of the arc. The duration of the actual arc and the deposit of weld metal may then vary materially.

In accordance with this invention, the timing of the arc is effected in response to the presence of an arc and not in response to the flow of current between the electrode and the work. Specifically, the timer which times out the duration of the welding interval is conditioned to time out by the flow of current which occurs when the electrode contacts the work, but it remains so conditioned and does not time out until after the arc is fired. In one of its specific aspects, this invention provides arc-spot welding apparatus including a current relay which responds to the flow of current between the electrode and the work and a voltage relay which is adapted to be connected between the electrode and the work when the current relay is actuated. The voltage relay is capable of becoming actuated for a voltage between the electrode and the work substantially equal to the arc voltage. Thus, the voltage relay is unactuated so long as no current is conducted between the electrode and the work because at this time the current relay is unactuated, and the voltage relay is unactuated when the electrode is in contact with the work because at this time the voltage across the voltage relay is substantially zero. But both the current relay and the voltage relay are actuated when there is an arc between the electrode and the work. The voltage relay has a contact which starts the timing out of the duration of the weld once it is actuated.

Figure 2:
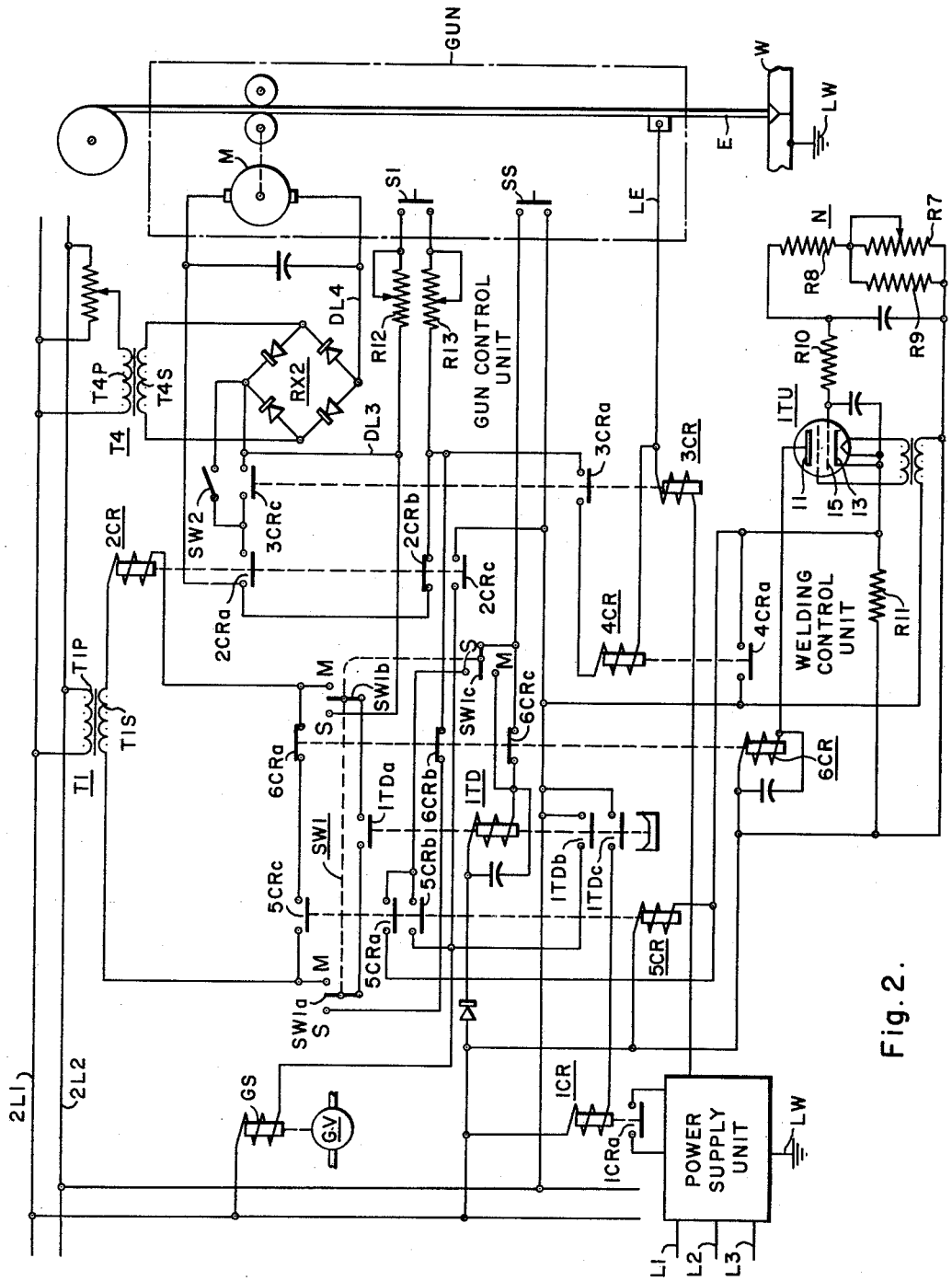

The novel features considered characteristic of this invention are disclosed generally above. The invention itself, both as to its organization and as to its method of operation, together with additional objects and advantages thereof, will be understood from the following description of specific embodiments taken in connection with the accompanying drawing, in which:

FIGURE 1 is a schematic showing apparatus in accordance with this invention for welding with a constant-current welder; and FIG. 2 is a schematic showing apparatus for welding in accordance with this invention with a welder of the constant-potential type.

The apparatus shown in FIG. 1 includes a Gun, a Power Supply Unit, a Gun Control Unit, and a Welding Control Unit. The above-described division into units is on a functional rather than a structural basis; that is, is governed by operation and not mechanical structure. Structurally, the parts are mounted to satisfy economy and convenience demands; the invention may even be practiced with presently available apparatus into which kit-modifications have been introduced. This apparatus is adapted to be energized from conductors L1, L2, L3 of a three phase supply. The control components of the apparatus usually operate at 110 volts and may be energized from conductors 2L1 and 2L2 which may derive their power from the supply through a step-down transformer (not shown).

The Gun may be of any type available in the art but in the specific practice of this invention, the Gun disclosed in application Serial No. 690,526, filed October 16, 1957, to George H. Cotter et al., has been found highly convenient. In the interest of clarity which comes with concreteness, this invention is described with reference to the Gun disclosed in the Cotter et al. application. This Gun includes a barrel through which a consumable welding electrode E is advanced and through which a highly pure stream of shielding gas such as argon, for example, flows to envelop the arc. The advancing mechanism includes a motor M which may have a permanent-magnet field and is mounted directly on the Gun and pulls the electrode E through the Gun towards the work W. The Gun also includes inching and starting switches SI and SS which are connected in the Gun Control and Welding Control Units.

The Power Supply Unit is of the so-called constant-current type. Such a Unit may be of any type available in the art. The Unit is characterized by a high internal impedance so that the current which it supplies to the arc is substantially constant. A typical such Unit is disclosed in Croco et al. Patent 2,752,529. The Croco apparatus is of the three phase type adapted to be supplied from an ordinary three-phase commercial supply through the conductors L1, L2, L3. The Unit has output conductors LE and LW. LW may be grounded. The conductor LE is connected through the coil of a current relay 3CR to a brush on the Gun which may be the electrode guide (not shown) and thus to the electrode E. The coil of relay 3CR may consist simply of a loop in the conductor LE. The conductor LW is connected to the work W. The relay 3CR has contacts 3CRa, 3CRc, which are connected in the Gun Control and Welding Control Units.

The Gun Control Unit includes a low-voltage direct-current supply for energizing the motor M during inching. This supply includes a transformer T2, the primary T2P of which is connected to conductors 2L1 and 2L2; the secondary T2S supplies a rectifier RX which in turn supplies the direct-current conductors DL1 and DL2. The Gun Control Unit also includes a relay 2CR which operates to connect the motor M selectively to the low-voltage conductors DL1 and DL2 and between the conductors LE and LW. The relay 2CR has front contacts 2CRa and 2CRc and back contact 2CRb. At the start of welding operation when 2CR is deenergized, the motor M is adapted to be connected in a circuit extending from DL1, through 2CRb, the motor, front contact 6CRb (through ground) of a relay 6CR in the Welding Control Unit, contact SW1a of selector switch SW1 in the Gun Control Unit, contact 1TDa of timer 1TD in the Welding Control Unit, contact SW1b, variable resistor R3 to DL2. With 2CR actuated, motor M is adapted to be connected across the arc in a circuit including conductor LE, a variable resistor R6, resistor R2, front contacts 3CRc of relay 3CR and 2CRa of relay 2CR, the motor M, to the work W (ground). The motor M is also adapted to be connected between DL1 and DL2 through R3 and the inching switch SI.

The coil of the relay 2CR is adapted to be connected across the secondary T1S of a transformer T1 through front contact 5CRc of relay 5CR and back contact 6CRa of relay 6CR both in the Welding Control Unit. The primary T1P of T1 is energized from conductors 2L1 and 2L2. Contact 5CRc is closed at the beginning of the spot timing interval and contact 6CRa is opened at the end of the spot timing interval so that relay 2CR remains actuated during the spot timing interval.

The Welding Control Unit includes a relay 1CR, the switch SW1, and the timer 1TD which may be a time-delay relay and which times the burn-back at the end of each spot weld. The Welding Control Unit also includes the arc-voltage responsive relay 4CR, the timer 2TD which times the spot, and the solenoid GS which controls the shielding gas valve. The relay 1CR has a contact 1CRa connected to the Power Supply Unit. This contact 1CRa when closed actuates the contactor (not shown) of the Power Supply Unit to energize the Unit so that a potential is impressed between the conductors LE and LW. The coil of relay 1CR is adapted to be connected between conductors 2L1 and 2L2 through contact 1TDc of relay 1TD. Switch SW1 has contacts SW1a, SW1b, SW1c, and sets the apparatus for spot welding (S) or for manual welding (M). Since the principal interest in this invention is in spot welding, the switch SW1 may be regarded as set for spot welding.

Relay 1TD has front contacts 1TDa, 1TDb and 1TDc. The coil of the relay 1TD is adapted to be connected between conductors 2L1 and 2L2 through a rectifier RX1, back contacts 6CRc of relay 6CR and starting switch SS. A capacitor 1C is connected across the coil. When the coil of relay 1TD is energized, the contacts 1TDa, 1TDb and 1TDc are closed immediately; when the coil is deenergized by the opening of its energizing circuit, the contacts 1TDa, 1TDb and 1TDc remain closed until the capacitor 1C discharges through the coil. The resistance of the coil winding and the capacity of the capacitor 1C are such that the relay 1TD drops out between about $\frac{1}{10}$ second and $\frac{1}{2}$ second after the coil is deenergized. Once the Power Supply Unit is energized, it is not deenergized until after 1TD times out (1TDc drops out).

The relay 4CR has front contact 4CRa. The coil of the relay 4CR is adapted to be connected between conductors LE and LW through contact 3CRa. Thus, the coil of 4CR is connected across the electrode and the work when adequate current flows through the electrode and the work to actuate 3CR. The relay 4CR is adapted to be actuated when the potential impressed across its coil is approximately equal to the potential of an arc between the electrode and the work. The actuation of the relay 4CR starts the timing-out of the spot welding interval.

The spot timer 2TD includes a thyratron 1TU having an anode 11, a cathode 13 and a control grid 15. The timer 2TD also includes the relays 5CR and 6CR and a time-constant network N including a capacitor 2C shunted by a variable resistor R7 and fixed resistors R8 and R9; resistor R9 being of large magnitude. Relay 5CR has front contacts 5CRa, 5CRb, 5CRc; relay 6CR has back contacts 6CRa, 6CRb, 6CRc.

The grid 15 of 1TU is connected to conductor 2L2 through time-constant network N and a grid resistor R10. The anode 11 of 1TU is connected to conductor 2L1 through the coil of 6CR; the coil is shunted by a capacitor 3C which suppresses relay chattering. The cathode 13 is adapted to be connected to conductor 2L2 through front contact 4CRa. Thus, the thyratron 1TU is capable of conducting current between its anode and its cathode when 3CR and 4CR are both actuated; that is, both when current is flowing between the welding electrode E and the work W and when there is an arc between the electrode E and work W. This starts the timing out of 2TD. The coil of the relay 5CR is also adapted to be connected between conductors 2L1 and 2L2 through the contact and 4CRa. 5CR is then instantaneously actuated only when two conditions exist at the same time, namely when there is current through LE and there is an arc between E and W at the start of the spot timing operation. A resistor R11 is connected across the coil of 5CR.

Contact 5CRb is connected across the start switch SS through SW1c and 1TDb so that once the timing out of 2TD starts the start switch SS may be opened without interrupting the continued operation of the apparatus. The start switch SS is connected across 4CRa through SW1c and 5CRa and the anode-cathode circuit of 1TU would be maintained closed and 5CR actuated once 5CR is actuated. At the end of a welding operation, 2TD is prevented from resetting so long as SS remains closed and SS must be permitted to open to start a new welding operation. Double cycling is thus prevented. Contact 6CRa is connected in the energizing circuit for 2CR and causes 2CR to be deenergized when 2TD times out and 6CRa opens; this opens the motor circuit and stops electrode E. The opening of 6CRb opens and prevents motor M from inching the electrode E. The opening of 6CRc starts the timing out of the burn-back time.

In the stand-by condition of the apparatus, an electrode E is threaded into the Gun and the disconnects or circuit breakers (not shown) are closed so that the conductors L1, L2 and L3 and the conductors 2L1 and 2L2 and DL1 and DL2 are energized. During stand-by, switches SI and SS are open. The relay 1TD is then deenergized and the motor M is deenergized. The relay 1CR is also deenergized so that there is no potential between the conductors LE and LW. The relays 3CR and 4CR are then deenergized. The cathode of the thyratron 1TU is disconnected from the conductor 2L2 and its anode-cathode circuit is open; 6CR is then deenergized. There is potential between 2L1 and 2L2 and during the half-periods during which 2L2 is positive with respect to 2L1 the network N is charged by current flowing between the grid and the cathode of the 1TU through the resistor R10 and the resistor R11 and the coil 5CR. The charge is such that the plate of 2C connected to the grid 15 is electrically negative and the other plate is electrically positive.

During stand-by it may be desirable to advance the electrode E through the Gun to welding position. Under such circumstances, the inching switch SI on the Gun is closed. The motor M is then energized through switch SI from the low voltage conductors DL1 and DL2 and electrode E is advanced slowly towards the work. In this way, the electrode E may be set for welding.

To initiate a spot-welding operation, the switch SS is closed. The relay 1TD is then actuated. The closing of contact 1TDc actuates the relay 1CR, closing contact 1CRa. Potential then appears between conductors LE and LW. The closing of contact 1TDb has no effect since at this time contact 5CRb is open. The closing of contact 1TDa energizes the motor M in the circuit, DL1, 2CRb, M, 6CRb, SW1a, 1TDa, SW1b, R3, DL2. The electrode E is then advanced towards the work at a relatively low speed.

When the electrode contacts the work, 3CR is actuated, closing 3CRa, and 3CRc. The closing of 3CRa connects the coil of 4CR between LE and LW but initially 4CR remains unactuated because the electrode E is in contact with the work W and the potential is small. The closing of 3CRc has initially no effect because 2CRa is open. As soon as an arc is fired between the electrode E and the work W, 4CR is actuated by the potential between LE and LW and 4CRa is closed. This actuates 5CR, closing 5CRa, 5CRb, 5CRc. The closing of 5CRc connects the coil of the relay 2CR across T1S through 5CRc and 6CRa. 2CR is then actuated, 2CRa closes and 2CRb opens. The motor M is then disconnected from the low voltage conductors DL1 and DL2 and is connected across the arc through R2 and the variable resistor. The motor now operates at full speed supplying the electrode at a rate depending on the arc voltage. Variations in the arc voltage are compensated by changes in speed of the electrode. The metal from the electrode E is now projected through the arc forming a spot.

The closing of 4CRa also connects the network N between the grid 15 and the cathode 13 so that the timing out of the network N is started. Initially the network N impresses a blocking potential between the grid 15 and the cathode 13 of the 1TU. The thyratron 1TU is then non-conducting and relay 6CR remains unactuated. The blocking potential is decreased in a time interval determined by the resistors R7, R8 and R9. When the network N is discharged to a predetermined potential, thyratron 1TU is rendered conducting, actuating relay 6CR. The interval timed by the network N is the interval during which the spot weld is produced. Essentially, the actuation of 5CR starts the spot weld and the actuation of 6CR stops it.

The cathode of the thyratron 1TU in the timer 2TD and the coil of 5CR now are connected to the conductor 2L2 through 5CRa and the start switch SS. If the start switch is maintained closed after 2TD times out, 5CRa remains closed and 2TD cannot be reset until the start switch SS is opened. Double cycling is thus avoided. In addition, the coil of the relay 1TD is locked in through 6CRc, 5CRb, and 1TDb, so that opening of the start switch SS before 2TD times out does not affect the timing of the spot.

The actuation of relay 6CR opens contacts 6CRa, 6CRb and 6CRc. The opening of contact 6CRa deenergizes relay 2CR which immediately drops out opening the motor supply circuit across the arc; the advance of the electrode E is then stopped. The opening of 6CRb maintains open the motor supply circuit from DL1 and DL2. The opening of 6CRc deenergizes the coil of 1TD and 1TD starts to time out. At this time, there is an arc between the electrode E and the work W but the electrode is not being advanced towards the work. The arc tends to burn-back the electrode E. At the end of the interval timed by 1TD, 1TDa, 1TDb and 1TDc open. The opening of 1TDa has no effect. The opening of 1TDc deenergizes 1CR opening 1CRa and deenergizing the Power Supply Unit and resetting relay 3CR. The opening of 1TDb conditions the resetting of 2TD on the opening of SS, if SS is closed or resets 2TD if SS is open. On the opening of SS, relays 5CR and 6CR are reset setting the system for another operation.

The practice of this invention where necessary with a constant-potential Power Supply Unit is similar to its practice with a constant-current Supply Unit except that the motor M is supplied independently of the arc both during starting and during normal welding operation. The constant-potential Unit may be of three-phase type as shown but more often will be of the single-phase type shown in application Serial No. 757,513. The motor M is supplied from a transformer T4, the secondary of which energizes conductors DL3 and DL4 through a rectifier RX2. During starting and during inching, the rectifier supplies the motor through variable resistors R12 and R13. During normal welding operation, DL3 and DL4 supply the motor directly through contacts 3CRc and 3CRa.

The invention disclosed herein is a method and apparatus in the practice and use of which highly precise arc spot timing may be achieved. While preferred embodiments of this invention are disclosed herein many modifications thereof are feasible. This invention then is not to be restricted except insofar as is necessitated by the spirit of the prior art.

We claim as our invention:

1. The method of producing an arc between a pair of electrodes during a predetermined time interval comprising contacting said electrodes to fire an arc and responsive only to the presence of said fired arc as distinct from the contact of said electrodes timing out said interval, said timing out starting only after said contacting of said electrode.

2. The method of producing an arc between a pair of electrodes during a predetermined time interval comprising contacting said electrodes while power is supplied to said electrodes to fire an arc between said electrodes, responsive only to the contacting of said electrodes only conditioning the timing out of said interval to start, and, after said timing out has been so conditioned and responsive only to the presence of said arc as distinct from the contacting of said electrodes, timing out said interval.

3. The method of welding work with an electrode from a power supply by producing an arc between said electrode and said work for a predetermined time interval comprising connecting said supply in power-supply relationship with said electrode and said work, engaging said electrode with said works while said supply is so connected to fire an arc between said electrode and work, responsive only to said engagement only conditioning said interval to start timing out, after said timing out has been so conditioned and responsive only to the presence of said arc, timing out said interval, and responsive to the timing out of said interval interrupting said arc.

4. The method of welding work with a consumable electrode from a power supply by producing a welding arc during a predetermined time interval between said electrode and said work comprising connecting said supply in power-supply relationship while said electrode is disengaged from said work continuously advancing said electrode towards said work, responsive only to the engagement of said electrode and said work only conditioning the start of the timing out of said interval, and also responsive to said engagement firing a welding arc between said electrode and said work, after said timing out has been so conditioned and responsive to only the presence of said arc as distinct from engagement of said electrode and said work, timing out said interval, and responsive to the timing out of said interval interrupting the advance of said electrode to interrupt said arc.

5. The method of welding work with a consumable electrode from a power supply by producing a welding arc during a predetermined time interval between said electrode and said work comprising connecting said supply in power-supply relationship while said electrode is disengaged from said work, continuously advancing said electrode towards said work, responsive only to the engagement of said electrode and said work only conditioning the start of the timing out of said interval, and also responsive to said engagement firing a welding arc between said electrode and said work, after said timing out has been so conditioned and responsive to only the presence of said arc as distinct from engagement of said electrode and said work, timing out said interval, responsive to the timing out of said interval interrupting the advance of said electrode and a predetermined time interval after said advance has been interrupted opening said connection between said supply and said electrode and said work.

6. The method of welding work with a consumable electrode from a power supply by producing a welding arc during a predetermined time interval between said electrode and said work comprising connecting said supply in power-supply relationship while said electrode is disengaged from said work continuously advancing said electrode towards said work at a relatively low inching speed, responsive only to the engagement of said electrode and said work only conditioning the start of the timing out of said interval increasing the speed of said electrode to welding speed, and also responsive to said engagement firing a welding arc between said electrode and said work, after said timing out has been so conditioned and responsive to only the presence of said arc as distinction from engagement of said electrode and said work, timing out said interval, responsive to the timing out of said interval, responsive to the timing out of said interval interrupting the advance of said electrode and a predetermined time interval after said advance has been interrupted opening said connection between said supply and said electrode and said work.

7. Apparatus for producing an arc between electrodes during a predetermined time interval comprising power supply means, conductors connected to said supply means for connecting said electrodes in power deriving relationship with said supply means, timing means, means connected to said conductors and said timing means and responsive to the flow of current through said conductors for conditioning said timing means to time out, and means connected to said timing means and responsive to the voltage between said conductors while said timing means is so conditioned for actuating said timing means to time out when said voltage is only at a magnitude substantially equal to the potential across said arc.

8. The method of melting a consumable electrode advanced continuously by a motor with an arc produced between said electrode and another electrode, said arc being energized from a power supply having a substantial internal impedance so that said arc draws substantially constant current, said method comprising energizing said motor with power at a reduced voltage independent of the potential between said electrode so that said conductor is advanced at a low inching speed until said consumable electrode contacts said other electrode and responsive to said contact thereafter connecting said motor across said electrode energizing said motor from said supply means with power at the voltage existing across said arc between said electrodes.

9. Apparatus for arc welding work with a consumable electrode comprising means to be connected to said electrode and work for supplying power to energize said arc, said power supply means having substantial internal impedance so that the current through said arc is substantially constant, motor means to be connected to said electrode for advancing said electrode, means connected to said motor means and effective only in the absence of substantial current between said electrode and work for impressing on said motor means a relatively low voltage independent of the potential between said electrode and work to energize said motor means so that said electrode is advanced at a low inching speed until said electrode contacts said work, and means connected to said supply means and to said motor means and responsive to contact of said electrode and work for energizing said motor means from said supply means at the voltage across said arc after said contact.

10. The method of welding work with an electrode during a predetermined time interval, the said method comprising causing the electrode to contact the work, responsive only to said contact of the electrode and the work only conditioning the timing out of said interval to start and also responsive to said contact firing an arc, and responsive only to the presence of said arc timing out said interval.

11. Apparatus for producing an arc between electrodes during a predetermined time interval comprising power supply means, conductors connected to said supply means for connecting said electrodes in power deriving relationship with said supply means, timing means, a current relay connected to said conductors and said timing means and actuable in response to the flow of current through said conductors for conditioning said timing means to time out, said timing means being so conditioned only while said current relay is actuated, and a voltage relay connected to said timing means and responsive to the voltage between said conductors while said timing means is so conditioned for actuating said timing means to time out when said voltage is at a magnitude substantially equal to the potential across said arc.

12. The method of melting a consumable electrode advanced continuously by a motor with an arc produced between said electrode and another electrode, said arc being energized from a power supply having a substantial internal impedance so that said arc draws substantially constant current, said method comprising energizing said motor with power at a reduced voltage directly derived from said supply independently of the potential between said electrodes so that said consumable electrode is advanced at a low inching speed, said consumable electrode being so advanced until said consumable electrode contacts said other electrode and an arc is fired between said electrodes, and responsive to said contact thereafter connecting said motor across said electrodes and energizing said motor from said supply with power at the voltage existing across said arc.

13. Apparatus for arc welding work with a consumable electrode comprising means to be connected to said electrode and work for supplying power to energize said arc, said power supply means having substantial internal impedance so that the current through said arc is substantially constant, motor means to be connected to said electrode for advancing said electrode toward said work, means connected to said motor means and energized independently of said electrode and work and effective only in the absence of substantial current between said electrode and work for impressing on said motor means a relatively low voltage to energize said motor means so that said electrode is advanced at a low inching speed until said electrode contacts said work, an arc being fired between said electrode and work as a result of said contact, and means connected to said supply means and to said motor means and responsive to said contact of said electrode and work for energizing said motor means from said supply means at the voltage across said arc.

References Cited in the file of this patent

UNITED STATES PATENTS

| | | |
|---|---|---|
| 1,831,343 | Caldwell | Nov. 10, 1931 |
| 2,007,751 | Chapman | July 9, 1935 |
| 2,057,521 | Harding | Oct. 13, 1936 |
| 2,460,990 | Kratz et al. | Feb. 8, 1949 |
| 2,468,570 | Nyburg | Apr. 26, 1949 |
| 2,654,015 | Landis | Sept. 29, 1953 |
| 2,752,469 | Price | June 26, 1956 |
| 2,776,361 | Essig | Jan. 1, 1957 |
| 2,806,127 | Hackman | Sept. 10, 1957 |
| 2,845,526 | Cameron et al. | July 29, 1958 |

FOREIGN PATENTS

| | | |
|---|---|---|
| 410,494 | Great Britain | May 16, 1934 |
| 798,292 | Great Britain | July 16, 1958 |
| 209,745 | Australia | Dec. 22, 1955 |